US008804522B2

(12) United States Patent
Grob-Lipski

(10) Patent No.: US 8,804,522 B2
(45) Date of Patent: Aug. 12, 2014

(54) METHOD AND ALLOCATION UNIT FOR ALLOCATING A COMMUNICATION PIPE IN A COMMUNICATION NETWORK

(75) Inventor: Heidrun Grob-Lipski, Starzach (DE)

(73) Assignee: Alcatel Lucent, Boulogne-Billancourt (FR)

( * ) Notice: Subject to any disclaimer, the term of this patent is extended or adjusted under 35 U.S.C. 154(b) by 54 days.

(21) Appl. No.: 13/513,964

(22) PCT Filed: Nov. 18, 2010

(86) PCT No.: PCT/EP2010/067750
§ 371 (c)(1),
(2), (4) Date: Jun. 5, 2012

(87) PCT Pub. No.: WO2011/076495
PCT Pub. Date: Jun. 30, 2011

(65) Prior Publication Data
US 2012/0243414 A1    Sep. 27, 2012

(30) Foreign Application Priority Data

Dec. 23, 2009  (EP) .................................... 09290992

(51) Int. Cl.
*H04L 12/26* (2006.01)
(52) U.S. Cl.
USPC ......................................... 370/235

(58) Field of Classification Search
USPC ........................................ 370/468, 230–235
See application file for complete search history.

(56) References Cited

U.S. PATENT DOCUMENTS

| | | | |
|---|---|---|---|
| 6,331,986 B1* | 12/2001 | Mitra et al. ................... | 370/468 |
| 6,912,232 B1* | 6/2005 | Duffield et al. ............... | 370/468 |
| 7,197,048 B1* | 3/2007 | Duffield et al. ............... | 370/468 |
| 8,077,621 B2* | 12/2011 | Hu ................................ | 370/235 |
| 2003/0007452 A1 | 1/2003 | Gorti et al. | |

OTHER PUBLICATIONS

International Search Report, Dec. 20, 2010.
Written Opinion of the International Searching Authority, Dec. 20, 2010.

* cited by examiner

*Primary Examiner* — Albert T Chou
(74) *Attorney, Agent, or Firm* — Harness, Dickey & Pierce

(57) ABSTRACT

The communication network includes a plurality of nodes interconnected by a plurality of links. The allocation unit assigns one or more network flows to the communication pipe. The one or more network flows have the same source node and the same destination node. The allocation unit determines a required capacity of the communication pipe based on the amount of network traffic associated to the one or more network flows and based on one or more minimal quality of service requirements associated with the one or more network flows. The allocation unit allocates one or more links of the plurality of links to the communication pipe for routing the one or more network flows from the source node to the destination node.

9 Claims, 1 Drawing Sheet

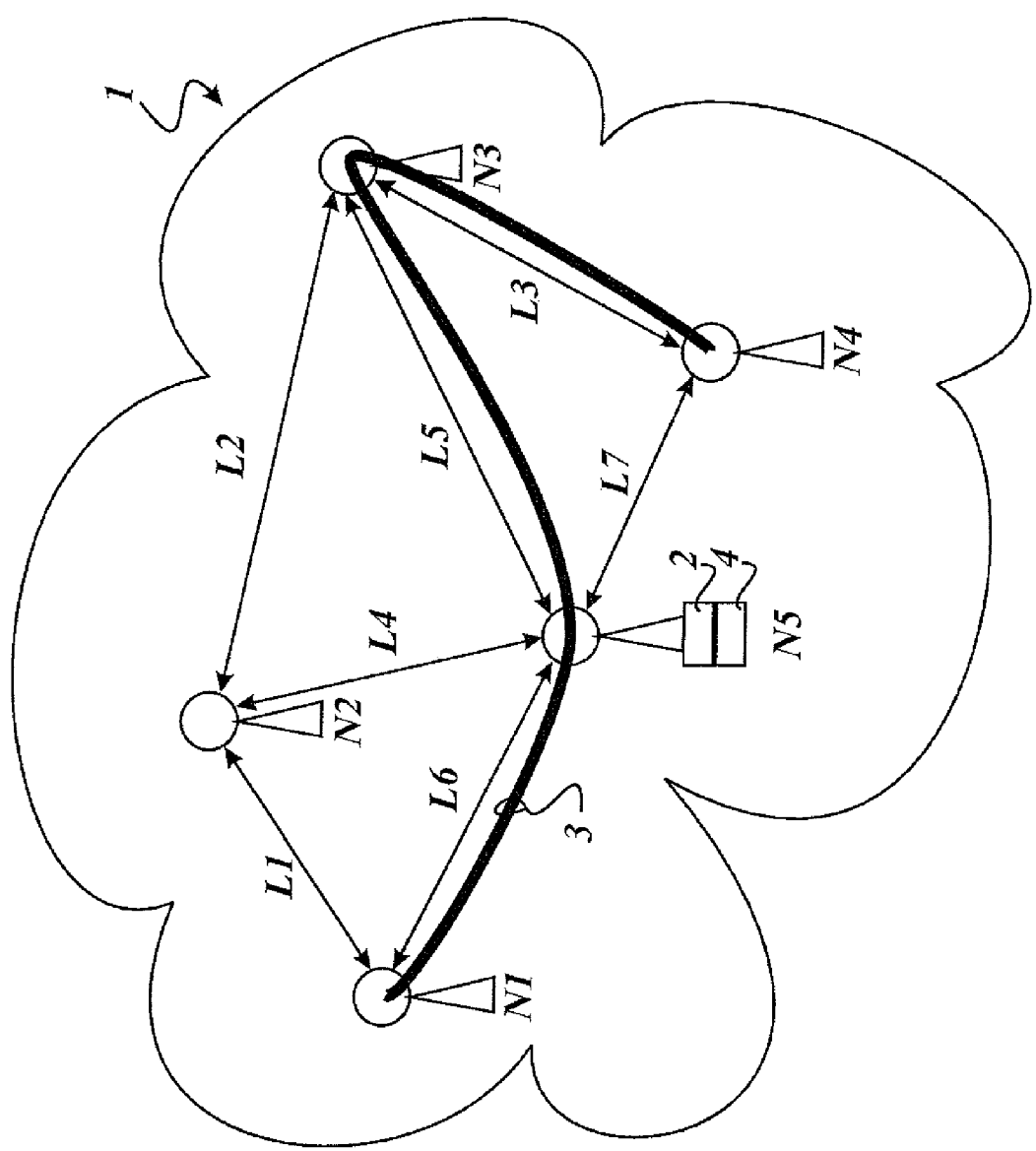

METHOD AND ALLOCATION UNIT FOR ALLOCATING A COMMUNICATION PIPE IN A COMMUNICATION NETWORK

BACKGROUND

The present invention concerns a method for allocating a communication pipe in a communication network as well as a corresponding allocation unit. The communication network comprises a plurality of nodes interconnected by a plurality of links.

Nowadays, there is rapidly increasing communication network traffic. The traffic flows, also called in the following flows, traffic, traffic flows or network flows, should be optimally routed through the communication network in order to guarantee a certain amount of QoS (QoS=Quality of Service), which might be a challenging task, since the traffic might augment faster than communication network hardware is improving.

SUMMARY

An object of the present invention is to provide an improved method for allocating a communication pipe in a communication network. A further object of the present invention is to provide an improve allocation unit for allocating a communication pipe in a communication network.

The object of the present invention is achieved with the method for allocating a communication pipe in a communication network comprising a plurality of nodes interconnected by a plurality of links, wherein a allocation unit assigns one or more network flows to the communication pipe, the one or more network flows having the same source node and the same destination node, wherein the allocation unit determines a required capacity of the communication pipe based on the amount of network traffic associated to the one or more network flows and based on one or more minimal quality of service requirements associated with the one or more network flows, and wherein allocation unit allocates one or more links of the plurality of links to the communication pipe for routing the one or more network flows from the source node to the destination node. The object of the present invention is further achieved by the allocation unit for allocating a communication pipe in a communication network comprising a plurality of nodes interconnected by a plurality of links, wherein the allocation unit is adapted to assign one or more network flows to the communication pipe, wherein the one or more network flows have the same source node and the same destination node, determine a required capacity of the communication pipe based on the amount of network traffic associated to the one or more network flows and based on one or more minimal quality of service requirements associated with the one or more network flows, and allocate one or more links of the plurality of links to the communication pipe for routing the one or more network flows from the source node to the destination node.

Preferably, the communication network is a packet based communication network, the Internet, a core network, an access network, a wireless meshed network, and/or a telecommunication network. A link of the communication network can be comprised by a physical and/or lower layer of the communication network. A communication pipe, also called pipe, of the communication network can be comprised by an abstract and/or higher layer of the communication network.

Embodiments according to the present invention can provide an admission control algorithm based on a combined pipe-dimensioning method in order to cope with, in particular real or expected, amount and the QoS requirements of the traffic flows. Embodiments according to the present invention can perform reciprocal pipe capacity allocation or reciprocal pipe allocation in order to reflect the quality of the pipes. In this way, it is possible that most of the traffic is assigned to the best pipe and small traffic is assigned to the pipes with less quality. Embodiments according to the present invention can perform a reciprocal link traffic flow allocation or reciprocal link allocation in order to reflect the traffic flow of the links. In this way, it is possible, that most of the traffic flow is assigned to the best link and small traffic flow is assigned to the links with less quality. Furthermore, embodiments of the present invention can provide a capacity allocation which reflects a measured quality of the pipes. Embodiments of the present invention can also provide an improved load balancing, an improved QoS, an improved bandwidth, an improved multi path routing method and/or improved network stability.

Further advantages are achieved by embodiments of the invention according indicated by the dependent claims.

According to a preferred embodiment of the present invention the allocation unit calculates a reciprocal communication pipe allocation factor for allocating the one or more network flows to the communication pipe correspondingly.

According to a preferred embodiment of the present invention the allocation unit calculates a reciprocal link factor for allocating the required capacity of the communication pipe to a link of the one or more links correspondingly.

According to a preferred embodiment of the present invention the allocation unit determines one or more services associated with the one or more network flows. Each of the one or more services has a minimal quality of service requirement. The allocation unit arranges a minimal quality of service requirement associated with the communication pipe based on the one or more determined services having the minimal quality of service requirement.

According to a preferred embodiment of the present invention a node of the plurality of nodes associated with one or more links of the plurality of links sends an arrival rate and a link service rate for each of the one or more links. Preferably, the arrival rate and the link service rate are associated with at least one of the one or more network flows. The allocation unit receives the arrival rate and link service rate for each of the one or more links. The allocation unit assigns a maximum delay time constraint to the communication pipe.

According to a preferred embodiment of the present invention the required capacity is determined by calculating a sum of mean data rates and a maximum of additional data rates. The mean data rates and additional data rates are associated with at least one of the one or more network flows. The additional data rates are related to at least one peak data rate of the one or more network flows and the calculation required capacity being subject to a maximum delay time constraint.

According to a preferred embodiment of the present invention the summands of the sum are weighted with a service dependent factor and/or a traffic class dependent overhead factor. Preferably the service dependent factor and/or the traffic class dependent overhead factor are associated with at least one of the one or more network flows.

According to a preferred embodiment of the present invention allocation unit requests the communication pipe from a routing module. The communication pipe provides the required capacity. The routing module assigns the one or more links to the communication pipe as allocated one or more links. The routing module routes data associated with the one or more network flows through the one or more links. Links of the one or more links providing a high capacity transport a large amount of the data. Links of the one or more links providing a low capacity transport a small amount of the data.

Preferably, a high capacity is larger than a low capacity. It is possible that the high capacity is at least two times larger than the low capacity. Preferably, a large amount of data is at least two times larger than a small amount of a data. It is possible that the large amount of data is at least two times larger than the small amount of data. Preferably, a low capacity is at least 16 kbps. A small amount of data comprises at least 16 kbps.

According to a preferred embodiment of the present invention a routing module pre-assigns links of the plurality of links to one or more communication pipes for allocating the one or more links to the communication pipe. The allocation unit requests during the allocation of the communication pipe the required capacity for each of the one or more links from the routing module.

According to a preferred embodiment of the present invention the routing module distributes the one or more network flows between the one or more links assigned to the communication pipe. The communication pipe provides a capacity exceeding the required capacity. Preferably, said capacity is maximally exceeding the required capacity.

According to a preferred embodiment of the present invention the routing module re-assigns said links to one or more communication pipes for allocating the one or more links to the communication pipe in case the one or more network flows have a new same source node and/or a new same destination node and/or a new required capacity has been determined by the allocation unit while adapting by the allocation unit the communication pipe to changed and/or new one or more network flows.

BRIEF DESCRIPTION OF THE FIGURES

These as well as further features and advantages of the invention will be better appreciated by reading the following detailed description of presently preferred exemplary embodiments taken in conjunction with the accompanying drawing of which FIG. 1 shows a diagram illustrating a communication network comprising a plurality of nodes interconnected by a plurality of links and a communication pipe.

DETAILED DESCRIPTION OF EXAMPLE EMBODIMENTS

FIG. 1 shows a diagram illustrating a communication network 1 comprising a plurality of nodes N1, ..., N5 interconnected by a plurality of links L1, ..., L7 and a communication pipe 3. Furthermore, the node N5 comprises an allocation unit 2 and routing module 4. The links L1, ..., L7 of the communication network 1 can be comprised by a physical and/or lower layer of the communication network. The communication pipe 3 of the communication network can be comprised by an abstract and/or higher layer of the communication network.

The communication network 1 is preferably an IP packet based communication network (IP=Internet Protocol). For instance, the communication network 1 is a telecommunication network, wireless meshed network, the Internet and/or a core network. Preferably, the nodes N1, ..., N5 provide a TCP/IP stack (TCP=Transmission Control Protocol). The nodes N1, ..., N5 can be routers, switches, bridges, personal computers, gateways, proxies, and/or mobile device, like cellular phones or base stations.

The allocation unit 2 and/or the routing module 4 can be realized by software and/or hardware means. The allocation unit 2 and/or the routing module 4 can be also provided through a middle ware technology, by a dedicated network node and/or a another, e.g. N2, of the network nodes N1, ..., N5. Preferably, it is not required, that the allocation unit 2 and/or the routing module 4 are provide by and/or located on a node which is assigned to the communication pipe 3.

Preferably, the network traffic comprises the one or more network flows. A network flow can be associated with a network and/or telecommunication service provided through the communication network 1. For instance, such a service is a Voice over IP service, Video Conference or Video streaming service, an electronic mail service, a hypertext or file transfer protocol service which can be secured, or mobile telecommunication service.

A preferred method of allocating a communication pipe 3 in a communication network 1 comprising a plurality of nodes N1, ..., N5 interconnected by a plurality of links L1, ..., L7 is described in greater detail as follows:

Resources used from AC (AC=Admission Control) are pipe capacities, i.e. communication pipe capacities, consisting of, preferably logical links L1-L5, with certain routing properties, e.g. a start point, like a source node N1, an end point, like a destination node N5, and definite QoS guarantees associated with a certain TC (TC=traffic class). The wording pipe or flow pipe may be used in the following for communication pipe. In order to enable a per flow pipe selection and QoS parameters to be taken into account, the pipes can be modeled with explicitly routed MPLS LSP-like paths (MPLS=Multiprotocol Label Switching, LSP=Labeled Switched Paths). Thereby, a communication pipe can correspond to an MPLS tunnel between to network nodes. The required pipe capacities are signaled to a routing module 4, which then initiates a network-wide routing to allocate the needed capacities.

Embodiments of the present invention are based on a two-step approach by allocating capacities. In a first step, pipe capacities are derived and/or determined with a pipe-dimensioning method. The derived or determined capacity is then allocated, preferably according to a reciprocal pipe capacity allocation method. If there is no pipe capacity available, a new pipe capacity and possibly routes have to be provided by allocating logical link capacity, preferably according to a reciprocal link capacity allocation method.

Thereby the method of allocating a communication pipe 3 can be understood as an admission control based on a combined pipe-dimensioning method and preferably, using reciprocal capacity allocation and/or reciprocal link allocation.

According to a preferred embodiment of the method the basic idea is to define an admission control algorithm based on a combined pipe-dimensioning method to cope with the real or expected amount and the QoS requirements of the traffic flows, i.e. flows, and performing a two-step reciprocal pipe and link capacity allocation in order to reflect the quality of the pipes and links.

In the following a currently preferred combined pipe-dimensioning method is described—being an exemplary embodiment of the invention—as follows:

A pipe dimensioning method for estimating the needed capacity by statistical multiplexing of aggregated flow demands is introduced. This induces savings in the pipe capacity allocations. The evaluated capacity has to fulfill the QoS requirements of all flow requests.

Within a traffic profile, a flow q can be described by a mean data rate $f_q$ and a peak data rate $f_q^{peak}$. Assuming that peaks are not simultaneous, only the highest peak must be guaranteed from the allocated pipe capacity.

It can be assumed that only one demand takes its peak value at a time. Each flow can be described by a pair of the mean data rate $f'_q$ and an additional data rate. $f''_q := f_q^{peak} - f'_q$.

The preferred traffic model may accurately describe the case of Poisson arrival rates with a predefined limit on the maximum delay.

With an arrival rate $\lambda$ and a link service rate $\mu$, the expected delay time is $$E[d] = \frac{1}{\mu - \lambda}.$$

f denotes the total number of bits per second transmitted on the link, U denotes the amount of capacity on the considered link and L the average data volume. E[.] denotes the expectation value of [.]. With $$\mu = \frac{U}{L}$$

and $$\lambda = \frac{f}{L}$$

$$E[d] = \frac{1}{\frac{U}{L} - \frac{f}{L}} = \frac{L}{U - f}.$$

For a constraint on the maximum delay time $\tau$ the capacity needed or required can be the capacity needed to fulfill the constraint on the delay time, i.e.

$$\tau \geq \frac{L}{U - f} \Leftrightarrow U \geq f + \frac{L}{\tau}.$$

If $$\frac{L}{\tau}$$

is set to the additional value $f''_q$ and as an aggregated flow is still a Poisson flow, the required capacity to fulfill the maximum delay constraint can be $$x := \sum_{q=1}^{r} f'_q + \max_{q=1,\ldots,r} f''_q.$$

However, most IP traffic will not have Poisson packet arrival rates (IP=Internet Protocol). Additionally, huge peak data rates are not unusual so that the formula can be adapted to the requirements of the services provided through the communication network 1.

Taking this into account, one or more service dependent factors $\alpha_s$ for taking into account the number of expected flows for a service $s \in S$ can be defined as well as one or more traffic class dependent overhead factors $\beta_{TC}$ can be defined, e.g. to cope with burstiness.

The factor $\alpha_s$ can enable a pre-allocation of pipe capacity based on the individual requirements of the service, which is classified with a certain traffic class TC. Then the required pipe capacity for the flow demands, probably generated from different services with different mean and max data rates, e.g. CBR and VBR video-on-demand (CBR=Constraint Based Routing, VBR=Variable Bit Rate), but classified with the same traffic class can be the traffic class required capacity $$x_{TC} := \sum_{s=1}^{S} \alpha_s \cdot f'_s + \beta_{TC} \cdot \max_s f''_s.$$

The traffic class required capacity can replace the required capacity.

For each service respectively for each traffic class, appropriate factors for $\alpha_s$ and $\beta_{TC}$ can be applied from Admission Control.

This pipe capacity can then be used to find or to create appropriate pipes together with a routing function with a message including the TrafficSpecification parameter, consisting of e.g. Traffic Class, Data rate (kbps), Delay (ms), Loss (%) and Jitter (ms).

In the following an Admission Control Algorithm is described as follows:

The Admission Control algorithm comprises the AC functions and the PIM functions (PIM=Pipe Initiation and Maintenance). The AC functions can comprise one or more functions of the group CheckPipe( ), GetPipe( ), AssociateFlowToPipe( ), Blocking( ) and RemoveFlowFromPipe( ). The PIM functions can comprise one or more functions of the group ModifyPipe( ) and GetPipe( ). Strategies for pipe dimensioning and load balancing will be applied.

The CheckPipe( ) function can perform as follows:

If a flow request message arrives, e.g. from a mobility module it can be checked together with a FlowToPipeMapping( ) whether there is at least one pipe available for the requested traffic class and destination:

1. If not, then execute function GetPipe( ).
2. If yes, then proceed as follows:
   Choose one or more pipes, preferably according to an applied strategy described, e.g. the below described reciprocal pipe allocation.
   Calculate the necessary respective one or pipe capacities including the new flow with the number of flows $r_s^{new}$ including the new flow of service s:

$$x_{TC}^{new} := \sum_{s=1}^{S} \sum_{q_s=1}^{r_s^{new}} f'_{q_s} + \beta_{TC} \cdot \max_s f''_s.$$

In case there is a pipe which may be suitable for an allocation. This pipe can be pre-allocated. In case such pre-allocated pipe has sufficient capacity, this pipe might be used to carry the new flow, additionally.

In case this pipe is pre-allocated, i.e. there is a current capacity $$x_{TC} := \sum_{s=1}^{S} \alpha_s \cdot f'_s + \beta_{TC} \cdot \max_s f''_s.$$

It is checked whether the current pipe is sufficient to carry all flows, i.e. if $x_{TC}^{new} < x_{TC}$:
i. If yes, then execute function AssociateFlowToPipe( )
ii. If not, then execute function ModifyPipe( )
In case this pipe is not pre-allocated then function ModifyPipe( ) may be executed.

The ModifyPipe( ) function can perform as follows:
In case the pipe is not pre-allocated, then the routing module can be asked or requested to enhance the pipe capacity to $$x_{TC}^{new} := \sum_{s=1}^{S} \sum_{q_s=1}^{r_s^{new}} f'_{q_s} + \beta_{TC} \cdot \max_s f''_s.$$

In case the pipe is not pre-allocated, then the routing module can be asked or requested to enhance the pipe capacity to a maximum link capacity.

The GetPipe( ) function can perform as follows:
In case the pipe is not pre-allocated, then the routing module can be asked or requested to deliver one or more pipes for service s classified with traffic class TC with capacity $x_{TC}:=f'_s+\beta_{TC}\cdot f''_s$. And it may be further checked if the capacity can be enhanced and it can be proceeded as follows:
1. If the capacity can be enhanced, then respond to AC by executing the AssociateFlowToPipe( ) function.
2. If the capacity can not be enhanced, then respond to AC by executing a Blocking( ) function.

In case the pipe is pre-allocated, then the routing module can be asked or requested to deliver new pipe(s) for traffic class TC with capacity $$x_{TC} := \sum_{s=1}^{S} \alpha_s \cdot f'_s + \beta_{TC} \cdot \max_s f''_s$$

and it can be proceeded as follows:
1. If the capacity can be enhanced, then respond to AC by executing the AssociateFlowToPipe( ) function.
2. If the capacity can not be enhanced, then respond to AC by executing a Blocking( ) function.

The AssociateFlowToPipe( ) function can perform as follows:
The flow to pipe mapping can be inserted into a FlowToPipeMapping table, preferably according to a reciprocal pipe allocation as described below. Then the mobility module can be informed about the admission of the flow with a label from a FlowToPipeMapping.

The Blocking( ) function can perform as follows:
The Blocking( ) function may updated statistics with a blocked flow.

The RemoveFlowFromPipe( ) function can perform as follows:
If a request to remove a flow arrives from the mobility module, then the flow can be deleted from the FlowToPipeMapping table.

According to a reciprocal pipe allocation a factor for allocation one or more flows q to a pipe j is proportional to a quality of the pipe j:

$$y_{q,j} = \frac{1/ServiceOutageTime_j}{\sum_i 1/ServiceOutageTime_i}.$$

In this way, it is possible that most of the traffic is assigned to the best pipe and small traffic is assigned to the pipes with less quality.

According to a reciprocal link allocation a factor for allocating pipe capacities $x_{TC}$ to a link e is proportional to the quality of the link e:

$$y_{x_{TC},e} = \frac{1/ServiceOutageTime_e}{\sum_i 1/ServiceOutageTime_i}.$$

In this way, it is possible, that most of the traffic is assigned to the best link and small traffic is assigned to the links with less quality.

The invention claimed is:
1. A method of allocating a communication pipe in a communication network comprising a plurality of nodes interconnected by a plurality of links, the method comprising:
assigning, by an allocation unit, one or more network flows to the communication pipe, the one or more network flows having the same source node and the same destination node;
determining, by the allocation unit, a required capacity of the communication pipe based on the amount of network traffic associated to the one or more network flows and based on one or more minimal quality of service requirements associated with the one or more network flows;
allocating, by the allocation unit, one or more links of the plurality of links to the communication pipe for routing the one or more network flows from the source node to the destination node;
sending, by a node of the plurality of nodes associated with one or more links of the plurality of links, an arrival rate and a link service rate for each of the one or more links, the arrival rate and the link service rate being associated with at least one of the one or more network flows;
receiving, by the allocation unit, the arrival rate and link service rate for each of the one or more links; and
assigning, by the allocation unit, a maximum delay time constraint to the communication pipe.

2. The method of allocating a communication pipe according to claim 1, further comprising at least one of:
calculating, by the allocation unit, a reciprocal communication pipe allocation factor for allocating the one or more network flows to the communication pipe correspondingly; and
calculating, by the allocation unit, a reciprocal link factor for allocating the required capacity of the communication pipe to a link of the one or more links correspondingly.

3. The method of allocating a communication pipe according to claim 1, further comprising:
determining, by the allocation unit, one or more services associated with the one or more network flows, each of the one or more services having a minimal quality of service requirement; and
arranging, by the allocation unit, a minimal quality of service requirement associated with the communication pipe based on the one or more determined services having the minimal quality of service requirement.

4. The method of allocating a communication pipe according to claim 1, wherein the required capacity is determined by calculating a sum of mean data rates and a maximum of additional data rates, the mean data rates and additional data rates being associated with at least one of the one or more network flows and the additional data rates being related to at least one peak data rate of the one or more network flows and the calculation required capacity being subject to the maximum delay time constraint.

5. The method of allocating a communication pipe according to claim 1, further comprising:
   requesting, by the allocation unit, the communication pipe providing the required capacity from a routing module;
   assigning, by the routing module, the one or more links to the communication pipe as allocated one or more links; and
   routing, by the routing module, data associated with the one or more network flows through the one or more links, wherein links of the one or more links providing a high capacity transport a large amount of the data and wherein links of the one or more links-providing a low capacity transport a small amount of the data.

6. A method of allocating a communication pipe in a communication network comprising a plurality of nodes interconnected by a plurality of links, the method comprising:
   assigning, by an allocation unit, one or more network flows to the communication pipe, the one or more network flows having the same source node and the same destination node;
   determining, by the allocation unit, a required capacity of the communication pipe based on the amount of network traffic associated to the one or more network flows and based on one or more minimal quality of service requirements associated with the one or more network flows;
   allocating, by the allocation unit, one or more links of the plurality of links to the communication pipe for routing the one or more network flows from the source node to the destination node;
   sending, by a node of the plurality of nodes associated with one or more links of the plurality of links, an arrival rate and a link service rate for each of the one or more links, the arrival rate and the link service rate being associated with at least one of the one or more network flows;
   receiving, by the allocation unit, the arrival rate and link service rate for each of the one or more links; and
   assigning, by the allocation unit, a maximum delay time constraint to the communication pipe, wherein,
      the required capacity is determined by calculating a sum of mean data rates and a maximum of additional data rates, the mean data rates and additional data rates being associated with at least one of the one or more network flows and the additional data rates being related to at least one peak data rate of the one or more network flows and the calculation required capacity being subject to a maximum delay time constraint, and
      the summands of the sum are weighted with at least one of a service dependent factor and traffic class dependent overhead factor, the at least one of the service dependent factor and the traffic class dependent overhead factor being associated with at least one of the one or more network flows.

7. A method of allocating a communication pipe in a communication network comprising a plurality of nodes interconnected by a plurality of links, the method comprising:
   assigning, by an allocation unit, one or more network flows to the communication pipe, the one or more network flows having the same source node and the same destination node;
   determining, by the allocation unit, a required capacity of the communication pipe based on the amount of network traffic associated to the one or more network flows and based on one or more minimal quality of service requirements associated with the one or more network flows;
   allocating, by the allocation unit, one or more links of the plurality of links to the communication pipe for routing the one or more network flows from the source node to the destination node;
   sending, by a node of the plurality of nodes associated with one or more links of the plurality of links, an arrival rate and a link service rate for each of the one or more links, the arrival rate and the link service rate being associated with at least one of the one or more network flows;
   receiving, by the allocation unit, the arrival rate and link service rate for each of the one or more links;
   assigning, by the allocation unit, a maximum delay time constraint to the communication pipe;
   pre-assigning, by a routing module, links of the plurality of links to one or more communication pipes for allocating the one or more links to the communication pipe; and
   requesting, by the allocation unit, during the allocation of the communication pipe the required capacity for each of the one or more links from the routing module;
   re-assigning, by the routing module, said links to one or more communication pipes for allocating the one or more links to the communication pipe in case the one or more network flows having a new same source node and/or a new same destination node and/or a new required capacity has been determined by the allocation unit while adapting by the allocation unit the communication pipe to changed and/or new one or more network flows.

8. The method of allocating a communication pipe according to claim 7, further comprising:
   distributing, by the routing module, the one or more network flows between the one or more links assigned to the communication pipe, wherein the communication pipe provides a capacity exceeding the required capacity.

9. An allocation unit for allocating a communication pipe in a communication network comprising a plurality of nodes interconnected by a plurality of links, the allocation unit being configured:
   assign one or more network flows to the communication pipe, wherein the one or more network flows have the same source node and the same destination node;
   determine a required capacity of the communication pipe based on the amount of network traffic associated to the one or more network flows and based on one or more minimal quality of service requirements associated with the one or more network flows;
   allocate one or more links of the plurality of links to the communication pipe for routing the one or more network flows from the source node to the destination node;
   receive, from a node of the plurality of nodes associated with one or more links of the plurality of links, an arrival rate and a link service rate for each of the one or more links, the arrival rate and the link service rate being associated with at least one of the one or more network flows; and assign a maximum delay time constraint to the communication pipe.

* * * * *